J. M. CLARK.

Mill Bolt.

No. 833. Reissued Oct. 4, 1859.

Witnesses.
Chas. G. Rugg
Wm. H. Harrison

Inventor
James M. Clark

N. PETERS, Photo-Lithographer, Washington, D. C.

UNITED STATES PATENT OFFICE.

JAMES M. CLARK, OF PHILADELPHIA, PENNSYLVANIA.

IMPROVEMENT IN FLOUR-BOLTS.

Specification forming part of Letters Patent No. 24,857, dated July 26, 1859; Reissue No. 833, dated October 4, 1859.

*To all whom it may concern:*

Be it known that I, JAMES M. CLARK, of Philadelphia, in the county of Philadelphia and State of Pennsylvania, have invented certain new and useful Improvements in Flour-Bolts; and I do hereby declare that the following is a full and exact description thereof, reference being had to the accompanying drawings, and to the letters of reference marked thereon.

Figure 1:
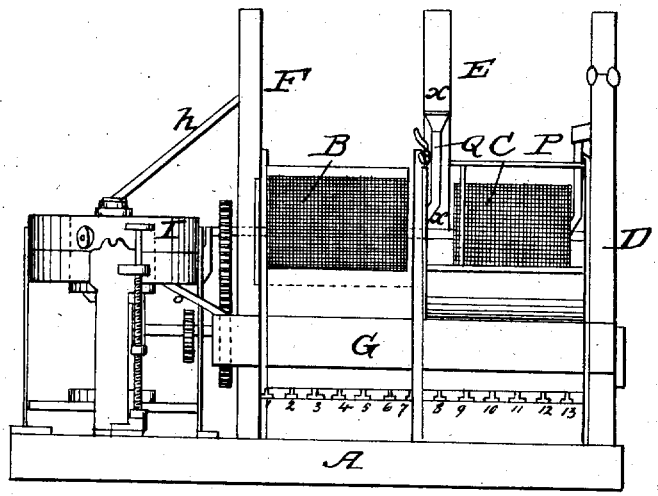
Figure 3:
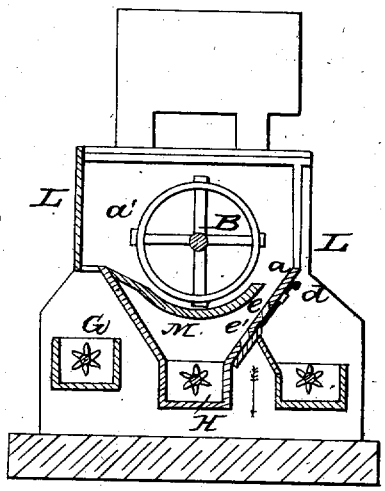
Figure 2:
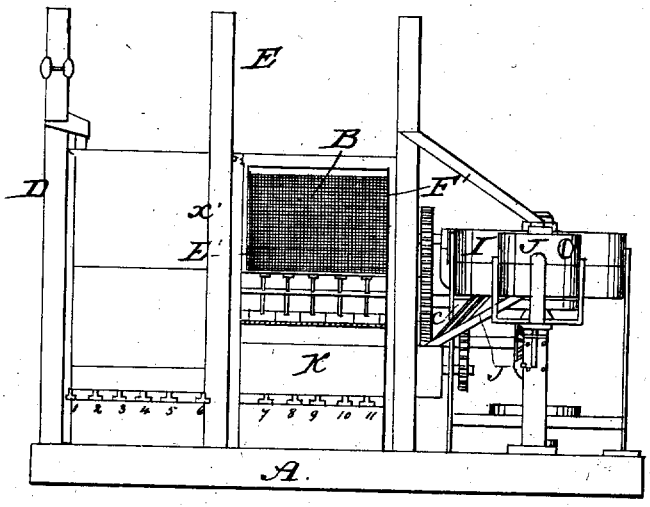
Figure 4:
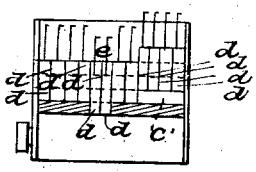

My invention consists in certain improvements in flour-bolts, described as follows:

Figure 1 represents a side elevation showing the two bolting-cloths exposed. Fig. 2 is a view of opposite side of the apparatus, only one bolting-cloth exposed. Fig. 3 is a cross-section through the front bolting-cloth and through the three conveyers. Fig. 4 is a view representing the system of slide-valves which regulate the flow of the different qualities of flour, &c.

In the figures, A represents the base on which is elevated the bolting chest L L, said chest being provided with a conveying-bottom, as shown in Fig. 3. Within the bolting-chest are placed two bolting-reels on one and the same shaft, and both the chest and the reels are divided by means of a partition at or near the center of the chest.

D E F represent the three elevators, D and F being placed at each end of the bolting-chest, with the center elevator, E, near the center of chest. One trunk, *x*, of elevator E passes up through the chest L, while the other trunk, *x'*, is outside of the chest.

P represents the spout, which leads down from the elevator D into the rear bolting-reel, C, and Q represents a spout which leads from the elevator E into the front bolting-reel, B.

G represents a long conveyer, which carries the ground material from the main grinding-mill, where it is first ground, back to the elevator D.

H in Fig. 3 represents a conveyer, which is situated under the conveying bottom of the bolting chest and extending its entire length, said conveyer being provided with apertures and slides, as seen in Fig. 1, and marked 1, 2, 3, 4, 5, and 6, &c., for the purpose of withdrawing any portion of the bolted material which may fall into said conveyer, if desired.

K represents a short conveyer, which is for the purpose of conveying the material which has been reground in the regrinding-mill J to the elevator E, from whence it is carried into the front bolting-reel, B. Fig. 1, I and J represent two grinding-mills, I being the large mill, in which the grain is ground before bolting; and J a small regrinding-mill, which is used for the purpose of regrinding the fine flour, middlings, shorts, shipstuff, and bran, or any portion of either of them which may require regrinding, and which reground material is never allowed to pass into the bolt C, where the double-extra and extra flour is made as it comes directly from the main grinding-mill.

*a*, Fig. 3, represents one of the converging sides of the bottom of the chest, which side *a* is provided with apertures *e* and *e'*. The aperture *e* leads into the conveyer K, extending from bolt-head F' to bolt-head E. The aperture *e'* allows the material, or any portion of it, to pass out between the conveyers H and K as rejected.

In Figs. 3 and 4, *d* represents a slide-valve or a series of valves, which are made without apertures, of any proper material, and are long enough to cover both apertures *e* and *e'* at the same time. By sliding up these valves I cover the apertures, and by pushing down the valves *d*, I cover the aperture *e'*, or by drawing the valves so that its upper end just covers the upper aperture I close both apertures at the same time by the valve *d*. The bolt C being too fine to allow coarser materials than the extra flour to pass through it, these materials are caused to pass out at the end of the bolt-reel C, and thence to the elevator E, and up said elevator, and emptied into spout Q, through which it passes to bolt B. The superfine flour, fine flour, middlings, shorts, shipstuff, and bran pass through this bolt and fall on the circular bottom M. Beginning at the head of the bolt B the grades are, first superfine, fine, middlings, shorts, shipstuff, and bran. As the reel revolves the scrapers *a'* carry the material on bottom M forward to the opening between said bottom and inclined side *a* of bolt-chest, as seen in Fig. 3. The valves *d* being closed at the head of the bolt B, the superfine flour passes down the side of the chest into conveyer H, from which it is drawn off at valves 1 and 2. The next valves, *d d*, being open, allow the fine flour to pass into the conveyer K from it to and up elevator E, down spout Q, into bolt B, where it is rebolted and refined as superfine flour. The slide-valves *d*, next to and near the tail of the bolt, being closed, the middlings pass down into the conveyer H, and are carried along it into the elevator F, up said elevator to spout *h*, down said spout to the regrinding-mill J, where it is all reground, and passes through spout P into conveyer K, by which it is carried to elevator E, up said elevator, and emptied into bolt B again, where it is rebolted and refined with the qualities being bolted, and yields superfine and fine flour, and, falling down as before, is drawn off at valves 1 2. The shorts, shipstuff, and bran, when required to be reground, can also be sent back to the regrinding-mill in the same manner and by the same means and at the same time as the middlings; so, too, can the fine flour, middlings, shorts, shipstuff, and bran, or either of or any portion or quality of either of them; so also can any quantity or quality of these different grades, by means of the valves *d*, be rebolted without regrinding, if desired.

In the construction of my valves *d*, I can make a more perfect valve with much less expense, as I do not cut holes through them, which is as expensive as to make my valves, and those valves with holes are not so perfect in their operation as mine are, for it will be seen that on each side of a hole there is left standing a portion of the valve, which will catch the falling material on it and carry it to the wrong place; but in the case of my valves there is no side left, and at each moving of the valve all the material that is to fall is removed with it, and there can be no mixture of the different quantities. Further, I by one valve can shut one aperture at a time, either the upper one, *e*, or the lower, *e'*, or at pleasure I can close both by the same valves; or I can alternate the valves *d* so as to have when desired, both the apertures closed or both opened at either end of the inclined side; or I can have some of them opening the upper aperture and others the lower one, thus at will so alternating them as to accomplish the end desired, the whole being under the control of the miller.

By means of the arrangement of my apertures and valves *d*, I am enabled to dispense with spouts, which thus saves much expense.

It will be seen that the regrinding-mill J is so arranged in reference to the main grinding-mill I, bolt B, elevator F, and other parts of my machinery that it derives its motion by gearing direct from the spindle of the main grinding-mill, and thereby diminishes the cost of the mill and renders the operation and construction simple, and brings the whole into a very compact form.

The spout *i* is used simply for the convenience of examination of the materials in the grinding-mill to ascertain if the grinding is going on properly.

I do not claim grinding and regrinding upon separate mills, as that has long been known; but

What I claim is—

1. The slide valve or valves *d*, so arragned and operating with the apertures *e e'* in the sides of the bolting-chest that either of these apertures can be opened or closed, or both closed, when required, for the purpose of turning the material as desired in either of three directions, as set forth.

2. In combination with these valves, the concave M and scrapers *a'* upon the bolt, all arranged and operating as herein set forth.

JAMES M. CLARK.

Witnesses:

CHAS. G. PAGE.

WM. H. HARRISON.